United States Patent
Ongg et al.

(10) Patent No.: US 9,942,333 B2
(45) Date of Patent: *Apr. 10, 2018

(54) CLOUD-BASED CONTENT LOCALIZATION

(71) Applicant: MICROSOFT TECHNOLOGY LICENSING, LLC, Redmond, WA (US)

(72) Inventors: Jay Ongg, Renton, WA (US); Stephen Wing-Fai Lee, Bellevue, WA (US); Stefania Crisci, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/073,325

(22) Filed: Mar. 17, 2016

(65) Prior Publication Data

US 2016/0198008 A1   Jul. 7, 2016

Related U.S. Application Data

(63) Continuation of application No. 13/828,774, filed on Mar. 14, 2013, now Pat. No. 9,300,727.

(51) Int. Cl.
  *G06F 15/16* (2006.01)
  *H04L 29/08* (2006.01)
  *G06F 12/00* (2006.01)

(52) U.S. Cl.
  CPC .............. *H04L 67/18* (2013.01); *H04L 67/06* (2013.01); *H04L 67/10* (2013.01); *H04L 67/28* (2013.01); *H04L 67/2852* (2013.01)

(58) Field of Classification Search
  CPC ....... H04L 41/509; H04L 67/10; H04L 41/50; H04L 41/0813; H04L 41/0823; H04L 41/0869; H04L 41/12

(Continued)

(56) References Cited

U.S. PATENT DOCUMENTS 5,664,206 A  9/1997 Murrow et al.
6,490,547 B1  12/2002 Atkin et al.
(Continued)

OTHER PUBLICATIONS

Mateos, Jaime, "A Web Services Approach to Software Localisation. Bringing Software Localisation Tools from the Desktop to the Cloud", A Dissertation Submitted to the University of Dublin, In Partial Fulfilment of the Requirements for the Degree of Master of Science in Computer Science, Available at: http://www.cs.tcd.ie/publications/tech-reports/reports.10/TCD-CS-2010-25.pdf, Retrieved on: Feb. 6, 2013, 110 pages.

Gross, Steffen, "Internationalization and Localization of Software", In PhD Thesis of Eastern Michigan University, Department of Computer Science, Jun. 19, 2006, 71 pages.

Shu, Bei, "Two Modes of Implementing an XML-Based Localization Pack: Embed and Extend", published on: Jun. 18, 2003, Available at: http://www.ibm.com/developerworks/xml/library/x-multlang/.

(Continued)

*Primary Examiner* — Zarni Maung
(74) *Attorney, Agent, or Firm* — Shook, Hardy & Bacon, L.L.P.

(57) ABSTRACT

Systems, methods, and computer-readable media having computer-executable instructions embodied thereon that provide updates to localized software are provided. Resources are stored on a server device and may be cached or stored locally at a client device. Updates to the resources are made available at the server device. The updates include translations of the resources to several languages. The client device checks for an update of the resource and downloads the update for the server when the application is launched or downloaded by a computing device.

20 Claims, 5 Drawing Sheets

(58) Field of Classification Search
USPC .................................. 709/203, 223–229, 250
See application file for complete search history.

(56) References Cited

U.S. PATENT DOCUMENTS

| | | | |
|---|---|---|---|
| 6,623,529 | B1 | 9/2003 | Lakritz |
| 6,671,818 | B1* | 12/2003 | Mikurak ................ G06Q 10/06 714/4.21 |
| 6,687,736 | B1 | 2/2004 | Lee |
| 6,993,568 | B1 | 1/2006 | Handuc et al. |
| 7,329,871 | B2 | 2/2008 | Fan et al. |
| 7,392,519 | B2 | 6/2008 | Nguyen et al. |
| 7,437,704 | B2 | 10/2008 | Dahne-Steuber et al. |
| 7,636,656 | B1 | 12/2009 | Nieh et al. |
| 7,757,227 | B2 | 7/2010 | Duplessis et al. |
| 7,765,281 | B1 | 7/2010 | Crow et al. |
| 7,788,648 | B2 | 8/2010 | Bossom et al. |
| 7,886,267 | B2 | 2/2011 | Pratt et al. |
| 7,921,288 | B1 | 4/2011 | Hildebrand |
| 7,987,087 | B2 | 7/2011 | Rich et al. |
| 8,181,157 | B2 | 5/2012 | Ericsson et al. |
| 8,489,980 | B2 | 7/2013 | Lakritz |
| 8,640,093 | B1 | 1/2014 | Gill et al. |
| 8,650,561 | B2 | 2/2014 | Gharabally et al. |
| 8,789,015 | B2 | 7/2014 | Lerum et al. |
| 8,909,703 | B2 | 12/2014 | Gupta et al. |
| 9,300,727 | B2* | 3/2016 | Ongg .................... H04L 67/10 |
| 9,442,744 | B2* | 9/2016 | Lerum .................. G06F 9/4448 |
| 2002/0111787 | A1 | 8/2002 | Knyphausen et al. |
| 2002/0156881 | A1* | 10/2002 | Klopp Lemon et al. ........................ H04L 29/06 709/224 |
| 2005/0097526 | A1 | 5/2005 | Hauduc et al. |
| 2009/0037830 | A1 | 2/2009 | Kulkarni et al. |
| 2009/0094609 | A1 | 4/2009 | Burukhin et al. |
| 2009/0276206 | A1 | 11/2009 | Fitzpatrick et al. |
| 2010/0011354 | A1 | 1/2010 | Gharabally et al. |
| 2010/0031235 | A1* | 2/2010 | Volkov .................... G06F 8/51 717/120 |
| 2010/0199037 | A1 | 8/2010 | Umbehocker et al. |
| 2011/0276939 | A1 | 11/2011 | Frankin et al. |
| 2011/0289424 | A1 | 11/2011 | Rovik et al. |
| 2012/0054712 | A1 | 3/2012 | Melvin, Jr. et al. |
| 2012/0095837 | A1 | 4/2012 | Bharat et al. |
| 2012/0245984 | A1 | 9/2012 | Lee |
| 2012/0290284 | A1 | 11/2012 | Aryattawanich et al. |
| 2013/0227522 | A1* | 8/2013 | Lerum .................... G06F 9/44 717/120 |
| 2013/0325870 | A1 | 12/2013 | Rouse et al. |
| 2014/0136180 | A1 | 5/2014 | Little |

OTHER PUBLICATIONS

"Globalization Step-by-Step", Retrieved on: Feb. 6, 2013, Available at http://msdn.microsoft.com/en-us/goglobal/bb688141.

White, John, "Localization Project Management Log", Published on: Apr. 29, 2010, Available at: http://ventajamarketing.com/110nblog/2010/04/salesforce-com-localization-a-work-in-progress/.

"Lingobit: Localization on Demand", Retrieved on: Mar. 14, 2013, Available at: http://www.lingobit.com/products/index.html.

"Localization", Retrieved on: Mar. 14, 2013, Available at: http://developer.android.com/guide/topics/resources/localization.html.

"Localizing String Resources", Retrieved on: Mar. 14, 2013, Available at: https://developer.apple.com/library/mac/™documentation/MacOSX/Conceptual/BPInternational/Articles/StringsFiles.html.

O'Gara, Maureen, "Localization Goes Cloud", Published on: Sep. 6, 2011, Available at: http://cloudcomputing.sys-con.com/node/1967186.

"Walkthrough: Using Resources for Localization with ASP.NET", Retrieved on: Mar. 8, 2013, Available at: http://msdn.microsoft.com/en-us/library/fw69ke6f(v=vs.80).aspx.

Bray, Greg, "Localization and Globalization in WP7 Applications Using Resource Files", published on: Sep. 19, 2010, Available at: http://codeblog.theg2.net/2010/09/localization-and-globalization-in-wp7.html.

Claus Pahl, "Cloud Service Localisation", [Online], 2012, pp. 1-15, [Retrieved from Internet on Dec. 26, 2014], http://doras.dcu.ie/17083/1 /esocc12.pdf.

Dominic Jones et al., "A Semantic Model for Integrated Content Management, Localisation and Language Technology X Processing", [Online], 2011, pp. 1-91, [Retrieved from Internet on Dec. 26, 2014], http://ceur-ws.org/Vol-775/775-complete.pdf#page=43.

Ge Cheng et al., "Sealed Storage for Trusted Cloud Computing", [Online], IEEE 2010, pp. 335-339, [Retrieved from Internet on Dec. 26, 2014], http://ieeexplore.ieee.org/stamp/stamp.jsp?tp=&arnumber=5541060.

Huan Liu et al., GridBatch: Cloud computing for Large-Scale Data-Intensive Batch Applications', [Online], IEEE 2008, pp. 295-305, [Retrieved from Internet on Dec. 26, 2014], http://ieeexplore.ieee.org/stamp/stamp.jsp?tp=&arnumber=4534231.

Notice of Allowance dated Jan. 14, 2015 in U.S. Appl. No. 13/789,091, 13 pages.

Non-Final Office Action dated Jul. 1, 2014 in U.S. Appl. No. 13/789,091, 22 pages.

Non-Final Office Action dated Jun. 5, 2015 in U.S. Appl. No. 13/828,774, 19 pages.

Notice of Allowance dated Nov. 30, 2015 in U.S. Appl. No. 13/828,774, 7 pages.

* cited by examiner

CLOUD-BASED CONTENT LOCALIZATION

CROSS-REFERENCE TO RELATED APPLICATIONS

This application is a continuation application of co-pending U.S. application Ser. No. 13/828,774, filed Nov. 28, 2012 and entitled "Cloud-based Content Localization." The entirety of the aforementioned application is incorporated by reference herein.

BACKGROUND

Conventionally, software is localized in accordance with various languages or dialects. Users speaking any of the selected languages for localization may interact with localized versions of the software. Strings located in software files may be localized by manual or automatic translation. Strings embedded in software code may be extracted, localized, and then reinserted back into the software code. For each localized version of the software, a separate string file is created.

Accordingly, the software may have one string file per localization and at least one file corresponding to default localization. A client device that executes the software may select a localization string file that matches the device's current location. A client device located in China may select the localized string resource having the appropriate Pinyin characters for the strings. A client device in England, however, may select the localized English characters for the strings. When the localized string file is unavailable for the device's current locale, the client device may select the default string file.

To reach a broad base of customers, localization files include other resources beyond strings. The localization files may include audio files, numbers, currency, and graphics that are translated to appropriately reflect the customs and norms of the locales where the software is executed. The client device may be loaded with multiple sets of localization files, each customized for a different device configuration. When a customer runs the software, the client device may select and load the localization file that best matches the device.

Localization of software may be time-consuming and expensive when the number of languages used is large. The localization costs comprise the time and money used to translate the content, create the localization file, and verify the correctness of the localization file. The costs may also include translation delays that impact release or shipment of the software. Accordingly, verifying localization files for the software may increase costs for the customers that execute the software.

SUMMARY

Embodiments of the invention relate to systems, methods, and computer-readable media for, among other things, updating localized resources for software executed by a client device. The client device may store several resources that are localized. The localized resources are translations of the software in different languages. When the software requests access to a resource, the client device may select the localized resource that best matches the current region or locale of the device.

When an update of the localized resource is available, a cloud-based server may store the updated content. In one embodiment, the server stores both the software and corresponding localized resources. The client device may check the server to determine whether an update of the localized resource for the application is available, in some embodiments. In an alternate embodiment, the server may notify the client device having the outdated localized content of the update. When the update is available, the server device may transmit the update to the client device and replace the content of the localized resource. In other embodiments, the server may send a delta representing changes to the localized resource stored by the client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the invention are described in detail below with reference to the attached drawing figures, wherein.

DETAILED DESCRIPTION

Figure 1:
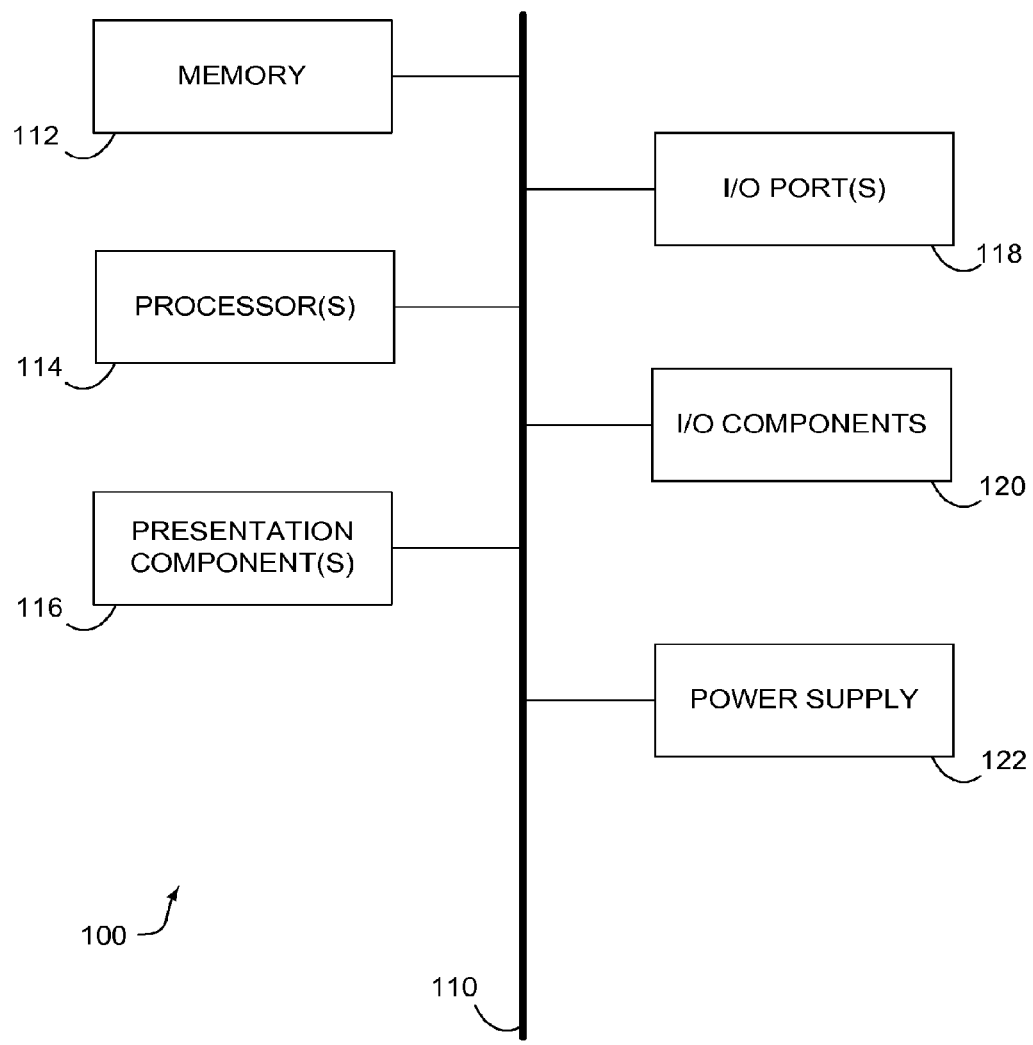
FIG. 1 is a block diagram of an exemplary computing environment in accordance with embodiments of the invention.

The subject matter of this patent is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Although the terms "step," "block," and/or "component," etc., might be used herein to connote different components of methods or systems employed, the terms should not be interpreted as implying any particular order among or between various steps herein disclosed unless and except when the order of individual steps is explicitly described.

Embodiments of the invention are directed to, among other things, a cloud-based platform that transmits translation deltas or new localization resources to client devices. The cloud-based platform allows quick updates for translation errors that may have geopolitical consequences. In some embodiments, the localization resources (e.g., strings, images, or audio) may be generated from the completed version of an application that does not ship. Testers may test the localization resources before including them in the servers of the network cloud. The updates are provided to client devices that execute the application corresponding to updated localization resources. The updates for the localization resources from the servers may include corrections for translations or additional languages that are not currently localized at the client device.

As used herein, language refers to an oral communication, dialect, or writing system that is common to individuals within the same community, geographical region, and/or culture. By way of example, types of languages include Chinese, English, German, Indian, Italian, Japanese, Spanish, forms thereof, and the like.

In some embodiments, the client device may select the localization resource that it needs. The client device may select the localization resource from any one of: a default localization resource, a locally stored localization resource, or a cloud-based localization resource. The default localization resource is stored by the client device. The default localization resource includes the default resources available to the application when the client device fails to support the language requested by the client device or the language of a region associated with the current location of the client device. The locally stored localization resource is a resource stored by the client device. The locally stored localization resource corresponds to the language requested by the client device or the language of a region associated with the current location of the client device. The cloud-based localization resource may include updates to the language requested by the client device or the language of the region associated with the current location of the client device. In other embodiments, cloud-based localization resources may not have any updates and may be a copy of the locally stored localization resource. The client device selection may be based on whether a cloud flag indicates that an update is available, whether the locally stored localization resource is available for the language requested by the client device, or whether the locally stored localization resource is available for the language of a region associated with the current location of the client device.

A computer system (e.g., e-book, tablet, or hand-held device) may execute applications for news, travel, finance, or readers for books. The computer system is configured to select localization resources for the applications. The localization resources may be configured for languages like Bosnian, Bangla, Chichewa, English, French, tribal languages, Tonga, etc. The computer system may connect to a cloud server to obtain the applications and one or more localization resources. In some embodiments, the localization resources may be selected based on a location associated with the device. In other embodiments, the localization resources are selected based on a user's selection of a language for the application.

FIG. 1 is a block diagram of an exemplary computing environment in accordance with embodiments of the invention. Having briefly described an overview of the embodiments of the invention, an exemplary operating environment in which various components may be implemented is described below. Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The embodiments of the invention may be described in the general context of computer code or machine-useable instructions, including computer-executable instructions such as program components being executed by a computer or other machine, such as a personal data assistant or other handheld device. Generally, program components including routines, programs, applications objects, components, data structures, and the like, refer to code that performs particular tasks or implements particular abstract data types. Embodiments of the invention may be practiced in a variety of system configurations, including handheld devices, tablet computers, consumer electronics, general-purpose computers, specialty computing devices, etc. Embodiments of the invention may also be practiced in distributed computing environments where tasks are performed by remote-processing devices that are linked through a communications network.

As one skilled in the art will appreciate, the computing device 100 may include hardware, firmware, software, or a combination of hardware and software. The hardware includes processors and memories configured to execute instructions stored in the memories. The logic associated with the instructions may be implemented, in whole or in part, directly in hardware logic. For example, and without limitation, illustrative types of hardware logic include field programmable gate array (FPGA), application specific integrated circuit (ASIC), system-on-a-chip (SOC), or complex programmable logic devices (CPLDs). The hardware logic allows the server to provide the localization resources to the client device. The server is configured to generate the localization resources for one or more applications stored on the client devices. The server may, in an embodiment, provide a delta file to the client devices. The delta file may include corrections to the localization resources. The correction may include removing content, adding content, blurring content, or changing colors of the content rendered by the client device. The server, in some embodiments, includes a distributed computer system for processing the requests for localization files.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component, such as a display device, to be an I/O component. Also, processors have memory. The inventors hereof recognize that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and nonremovable media. Computer-readable media may comprise computer storage media and communication media.

Computer storage media includes volatile and nonvolatile, removable and nonremovable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, Digital Versatile Disks (DVD) or other holographic memory, magnetic cassettes, magnetic tape, magnetic disk storage or other magnetic storage devices, or any other medium that can be used to encode desired data and that can be accessed by the computing device 100. In an embodiment, the computer storage media can be selected from tangible computer storage media like flash memory. These memory technologies can store data momentarily, temporarily, or permanently. Computer-storage media excludes and does not include communication media.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components include a microphone, joystick, game pad, satellite dish, scanner, printer, wireless device, a controller, such as, a stylus, a keyboard, and a mouse, or a natural user interface (NUI), etc.

The NUI processes air gestures, voice, or other physiological inputs generated by a user. These inputs may be interpreted as translation requests, requests for updating content for a software application, or requests for interacting with a the cloud server. These requests may be transmitted to the appropriate network element for further processing. The NUI implements any combination of speech recognition, touch and stylus recognition, facial recognition, biometric recognition, gesture recognition (both on screen and adjacent to the screen), air gestures, head and eye tracking, and touch recognition associated with displays on the computing device 100. The computing device 100 may be equipped with depth cameras such as stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Various aspects of the technology described herein are generally employed in computer systems, computer-implemented methods, and computer-readable storage media for, among other things, correcting and updating localization resources. In one embodiment, a server may store applications and localization resources that correspond to specific region of the globe. The localization resources correspond to, among other things, a language (e.g., Japanese, Chinese, English, Spanish, Indian). By way of example only, an application might have localization resources in twenty languages.

The localization resources allow a computing device executing an application to provide a culturally relevant adaption of the application for a specific region of the globe. As such, application features, such as the user interface, settings, metadata, text, images, audio, and/or the like, are translated to correspond with the language and/or culture of the geographic region for the application. By way of example only, the English version of an e-book application or news application may be adapted or converted to a Japanese version of Windows® so that it can be utilized in Japan.

Such localized applications might be analyzed to verify that the localization resources (which may be stored on a cloud server) appropriately incorporate the language desired, intended, or expected to be viewed by a user of the client device in a specific geographic region. By way of example only, an application and corresponding localization resources may be developed and distributed in China. In such a case, the localized resources may include varying forms of Pinyin characters, images, or audio having dialects that correspond with the local geographic region. The localization resources enable individuals that communicate using Chinese to interact with the application. The application, or a portion thereof, might not be properly, accurately, or completely translated into a desired language based on the error or incomplete localization resources. After verifying that localization resources are inaccurate, the server may receive updated localization resources with corrections that are made available to the client devices having the specific geographic region that corresponds the corrections in the desired language or dialect.

In one embodiment, a computer system may include a cloud server that is accessible by a client device. The cloud server stores applications and localization resources. The cloud server may be an application store. The client devices may access the application to download the applications and corresponding localization resources. In some embodiments, the client devices may purchase the application and one or more localization resources of interest to a user of the client device. The user of the client device may select an application and a corresponding language for the application. The client device may download from the application store the selected application and localization resources. The downloaded application and corresponding localization resource may be stored on the client device. Once downloaded, the application store may receive updates to the localization resource. When the downloaded application is launched, the application may check for updates to the localization resource before executing the rendering instructions. If updates are available at the application store, the client device obtains the updates, replaces the localization resource, and continues executing the application.

Figure 2:
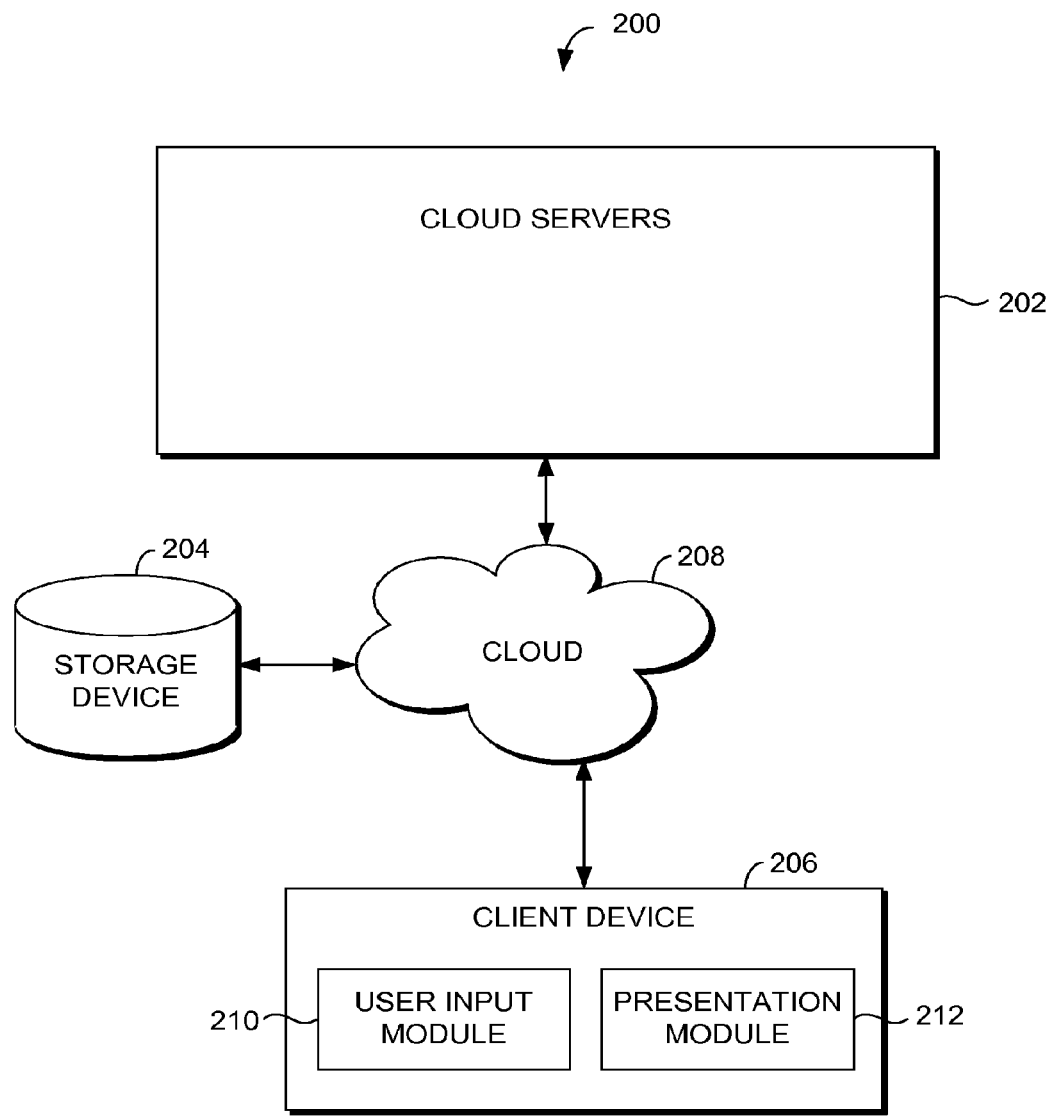
FIG. 2 is a block diagram of an exemplary computing system architecture in accordance with embodiments of the invention.

FIG. 2 is a block diagram of an exemplary computing system architecture 200 in accordance with embodiments of the invention. The computing system architecture 200 includes, among other things, cloud servers 202, storage device 204, client device 206, and cloud network 208. It is understood and appreciated by those of ordinary skill in the art that the computing system architecture 200 shown in FIG. 2 is merely an example of one suitable computing system and is not intended to suggest any limitation as to the scope of use or functionality of the embodiments of the invention. Neither should the computing system architecture 200 be interpreted as having any dependency or requirement related to any single module/component or combination of modules/components illustrated therein.

The cloud servers 202, storage device 204, and client device 206 are connected to each other and in communication with one another via a cloud network 208. The cloud network 208 may include, without limitation, one or more local area networks (LANs) and/or wide area networks (WANs). Such networking environments are commonplace in offices, enterprise-wide computer networks, intranets and the Internet. The cloud network may be provided or maintained by Microsoft, Amazon, Apple, or any other cloud provider. Accordingly, the cloud network 208 is not further described herein.

Each of the cloud servers 202 and the client device 206 shown in FIG. 2 may be any type of computing device such as for example, computing device 100 described above with reference to FIG. 1. By way of example only and not limitation, each of the server 202 and the client device 206 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The cloud servers 202 may include any type of application server, database server, or file server configurable to perform the methods described herein. In addition, the server 202 may be a dedicated or shared server. One example, without limitation, of a server that is configurable to operate as the server 202 is a structured query language ("SQL") server executing server software such as SQL Server 2005, which was developed by the Microsoft Corporation headquartered in Redmond, Wash.

Components of the cloud servers 202 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via a network (e.g., network 208). More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 200 is merely exemplary. While the server 202 is illustrated as a single unit, one skilled in the art will appreciate that the cloud servers 202 is scalable. For example, the server 202 may in actuality include a plurality of servers in communication with one another. Moreover, the storage device 204 may be included within the cloud servers 202 or client device 206 as a computer-storage medium. The single unit depictions are meant for clarity, not to limit the scope of embodiments in any form.

The cloud server executes application stores that provide applications via the cloud network 208. The cloud servers 202 may receive requests to download an application or localization resources. In one embodiment, the cloud servers 202 automatically generate localization resources for a selected number of languages. The generated localization resources are stored in appropriate folders on the cloud servers. The folders may specify the application and language associated with the localization resources. The cloud servers 202, in some embodiments, may monitor one or more applications executing on the client devices 206 if permitted by the user of the client device 206. The cloud servers may provide one or more localization resources based on a request from the client devices 206. The request from the client devices may include a geographical region or a language for which localization resources are requested. In turn, the cloud servers provide the request localization resources. In one embodiment, the localization resource may include a delta file having updates to a localization resource stored by the client device.

The storage device 204 is configured to store, among other things, applications or localization resource files. The storage device 204 is accessible by the cloud servers 202. In various embodiments, such information may include, without limitation, text, images, audios, information associated therewith, and the like, in association with various languages. In embodiments, the storage device 204 is configured to be searchable for one or more of the items stored in association therewith. It will be understood and appreciated by those of ordinary skill in the art that the information stored in association with the storage device 204 may be configurable and may include any information relevant to one or more applications. The content and volume of such information are not intended to limit the scope of embodiments of the invention. Further, though illustrated as a single, independent component, the storage device 204 may, in fact, be a plurality of storage devices, for instance a database cluster, portions of which may reside on the server 202, the client device 206, another external computing device (not shown), and/or any combination thereof.

As shown in FIG. 2, the client device 206 includes a user input module 210 and a presentation module 212. The client device executes one or more applications retrieved from the application store of the cloud servers 202. The one or more applications are interacted via the user-input module 210 and application content is rendered via the presentation module 212. In one embodiment, the applications may be updated using localization resources provided by the cloud servers 202. The updates to the application may alter the text, images, audio, or graphics rendered by the presentation module 212. The updates may include changes in languages, colors, or other culturally relevant indicators that may have been incorrectly formatted when the application was initially downloaded.

In some embodiments, one or both of the modules 210 and 212 may be implemented as stand-alone applications.

These stand-alone applications may be downloaded from the cloud server 202. In other embodiments, one or both of the modules 210 and 212 may be integrated directly into the operating system of the client device 206. It will be understood by those of ordinary skill in the art that the modules 210 and 212 illustrated in FIG. 2 are exemplary in nature and in number and should not be construed as limiting. Any number of modules may be employed to achieve the desired functionality within the scope of embodiments hereof.

The user input module 210 is configured for receiving input. Typically, input is received via a user interface (not shown) associated with the client device 206 or the like. Upon receiving input, the presentation module 212 of the client device 206 is configured for presenting results appropriately localized based on localization resources. Embodiments are not intended to be limited to visual display but rather may also include audio presentation, combined audio/video presentation, and the like.

Accordingly, a cloud server provides the localization resources via the cloud network to a client device. The cloud server is communicatively connected to a storage device that stores applications and one or more corresponding localization resources. The localization resources include string files for several languages. The application and localization resources may, in certain embodiments, be accessed via a file path or uniform resource identifier (URI). For each localization resource, the path or URI information may be different. The URI, in an embodiment, is based on: application identifier, application version, and current language. The cloud server may share a URI like https://appex{AppID}appupdate.blob.core.windows.net/001/Resources/{AppVersion}/{Lanuage}/strings.json. The parameters {AppID}, {AppVersion}, and {Language} are updated by an applications executed on the client device. For instance, a client device executing a travel application in the United States of America may request a localization resource stored at a cloud server URI (https://appextravelappupdate.blob.core.windows.net/001/Resources/1.5.0.123/enus/strings.json) completed by the client device executing the travel application. The localization resource is downloaded from the cloud server to the client device, where the localization resource is stored and updates to the localization resource are made without updating the application itself. The localization resource downloaded from the cloud server may override localized resources in a client device. The localization resource may update string or content associated with an application, advertisements provided to an application, or advertisements available on the client device.

In some embodiments, a client device is updated with a custom interceptor that selects either a localization resource on the client device or a localization resource available at a cloud store. The custom interceptor may be triggered when the application is launched or when the localization resource on the client device is requested by the application executing on the client device. If an update is available, the custom interceptor obtains the localization resource from the cloud store. The cloud store may update a flag on the client device to indicate that an update is available for a specific localization resource. When a request is generated by the application executed on the client device, the custom interceptor may check the flag to determine whether an update is available for the localization resource stored on the client device and requested by the application.

Figure 3:
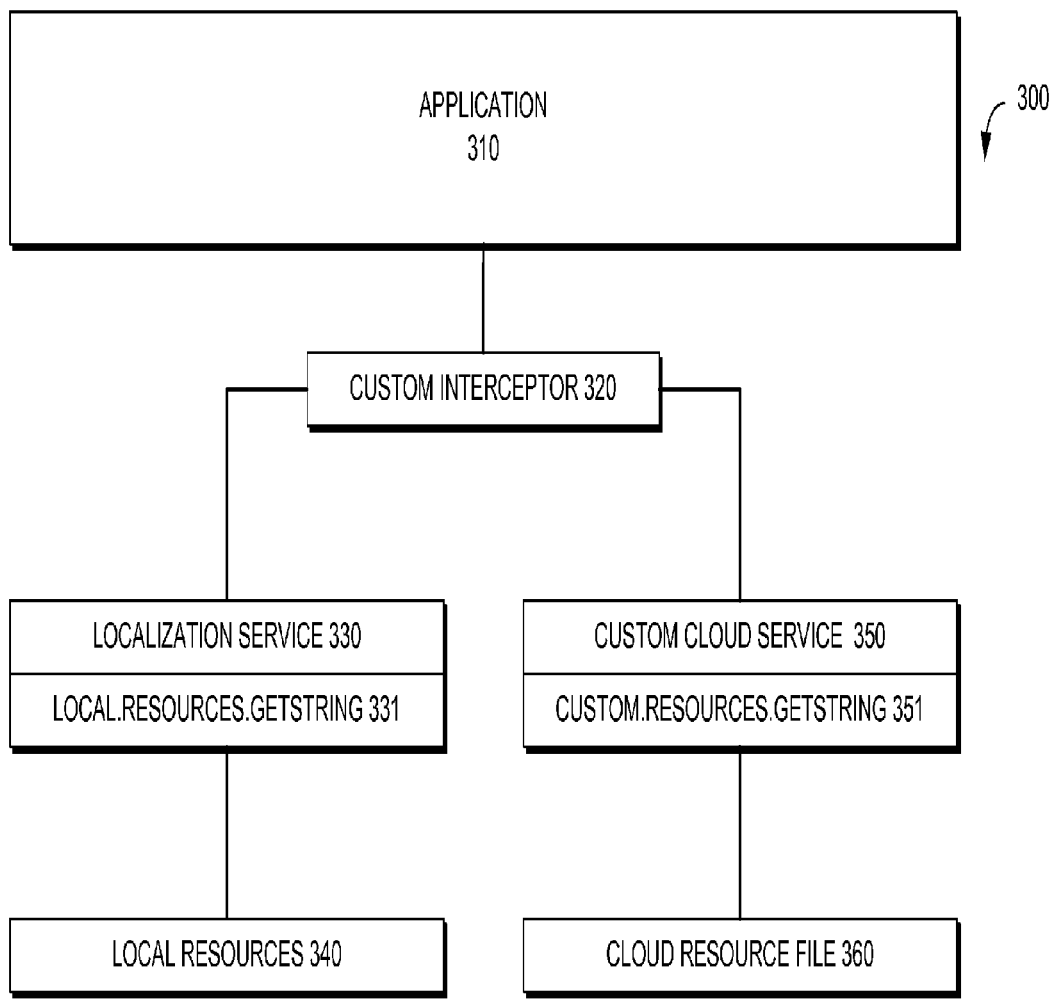
FIG. 3 is a block diagram of an exemplary function diagram in accordance with embodiments of the invention.

FIG. 3 is a block diagram of an exemplary function diagram 300 in accordance with embodiments of the invention. The function diagram 300 illustrates selecting between a local or default version of a localization resource 340 and a cloud store version of the localization resource 360 (cloud resource file). Stated differently, an application 310 may interact with a custom interceptor 320 to provide updates to localization resources stored locally by or cached by the client devices. The application 310, in one embodiment, is executed locally on the client device. In an alternative embodiment, the application may be executed remotely on an application network or application server.

As shown in FIG. 3, the custom interceptor 320 may trigger localization service 330 or a custom cloud service 350. The custom interceptor 320, in one embodiment, overrides a default implementation of get_string executed by the client device with a custom implementation. This implementation may redirect application requests to a local or default localization resource 340 or a cloud localization resource based on updates to localization resources at the cloud store.

When a cloud localization resource is updated or a new localization resource for a specific region is available at the cloud store, the custom interceptor 320 may, in one embodiment, receive a notification from the cloud store. The updated or new localization resource stored by the cloud store may be accessed by a custom cloud service 350 that responds to a request from the custom interceptor 320 that is triggered by the application 310. The custom cloud service 350 implements a custom get_string function 351 that retrieves updated or new cloud localization resource 360. The updated or new cloud localization resource 360 is provided to the corresponding application 310 executed by the client device. Accordingly, when an update is available or a new language is included in the cloud localization resource 360, the custom interceptor 320 may download cloud localization resource 360 to the client device. Absent an update to a cloud localization resource 360 or a new cloud localization resource 360, the custom interceptor 320 may implement the localization service 330 that provides access to a local or default localization resource 340 stored on the client device in response to requests from the application 310.

In some embodiments, the client device maintains an in-memory cache of the local or default localization resource 340 to facilitate fast lookups for the application 310. The in-memory cache may be updated when: the application 310 is launched (e.g., asynchronously) or a cloud localization resource 360 is downloaded from the cloud store. The change from the cached local localization resource 340 to the cloud localization resource 360, in an embodiment, may occur in real time without a required restart of the application 310 executed by the client device.

Accordingly, the custom interceptor 320 may retrieve localization resources 340 or 360 to respond to an application request. However, when a localization resource is not available, either at the cloud store or on the client device, the application 310 may select a default localization resource. In some embodiments, the client device may notify the cloud store that a user of the client device requested a language that is not cached or stored. The client device may load content from the local or cloud localization resources (340, 360) when the language is available. In other embodiments, a default localization resource is processed by the application if both the local localization resource 340 and cloud localization resource 360 fail to satisfy the language requested by a user of the application.

The cloud store may include a database having localization resources. The localization resource may correspond to multiple languages. In some embodiments, the client device caches localization resources temporarily. The client device may periodically access the cloud store to retrieve a most recent version of a localization resource. The client device, in certain embodiments, may access the cloud store and download a most recent versions when an update is available at the cloud store or when the cache at the client device expires.

Figure 4:
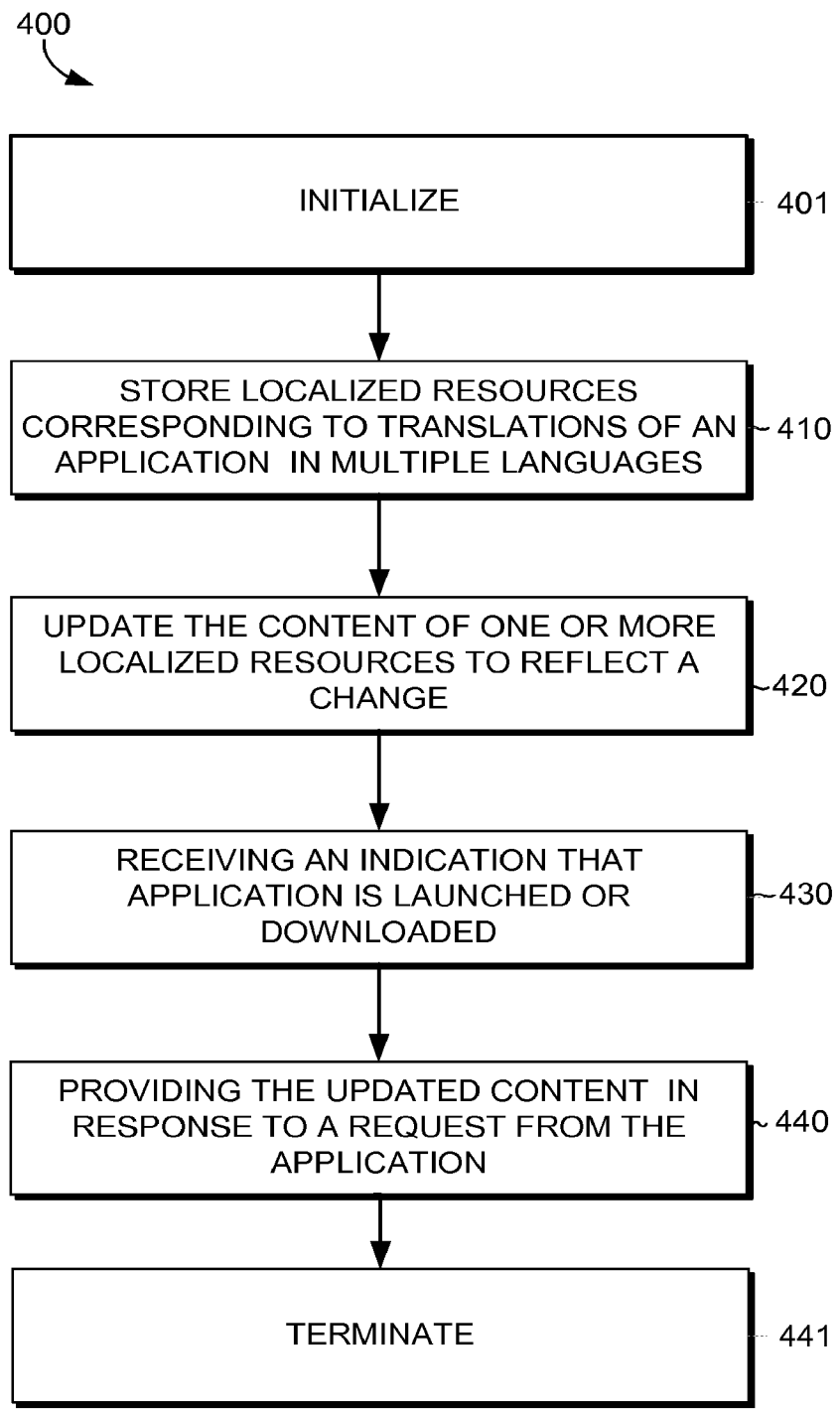
FIG. 4 is a logic diagram showing a method for updating localization resources in accordance with embodiments of the invention.

FIG. 4 is a logic diagram 400 showing a method for updating localization resources in accordance with embodiments of the invention. In one embodiment, an application that is downloaded from the cloud store may include default localization resources. When the application is launched for the first time, the application may utilize the default resources. After the application is launched, the cloud store may be accessed to obtain a localization resource corresponding to a language selected by the user. The cloud localization resource may be used instead of the default localization resource. Alternatively, at the same time that the application is launched, the cloud store may be accessed to obtain a localization resource corresponding to a language selected by the user. In other embodiments, the application downloaded by the user may be associated with a localization file requested by the user by specifying a language other than the default (e.g., English). The method initializes in step 401.

The cloud application store, in step 410, may store an application and several localization resources associated with different languages for rendering application content. The content associated with the localization resources may be updated to reflect a change in the content, in step 420. The update may include spelling corrections, color corrections, audio corrections, etc. In one embodiment, the updated content is stored in a delta file. The updated content may be provided in response to a get content command from the application executed on the client device. The content is stored on the client device. In other embodiments, the content is cached on the client device. The cache may expire after a predetermined time period (e.g., 24 hours). Once the cache expires, the client device may check for updates to the localization resources.

The cloud application store stores the content, the localization resources, and the application. In step 430, the cloud store may receive an indication that the application associated with the content updates is launched or downloaded on a client device. In some embodiments, the cloud store, in step 440, provides the updated content in a localization resource from the network cloud having the cloud-based application store to the client device. In at least one embodiment, when the cloud application store updates the content of one or more of the localization resources to reflect the change in the content, the cloud store may automatically translate the update into multiple languages. The client device may check updates to localization on a periodic basis. For instance, the client device may check when an application is downloaded, a configurable time period (e.g., daily, weekly, monthly, yearly), when configuration changes are made to the application or the client device. In another embodiment, if the file is corrupted, the client device may request a copy of the most recent localization file from the cloud application store.

A cloud application store, in one embodiment, is configured to provide notifications when updates to localization resources become available. A flag on a client device having an application that uses an outdated localization resource may be set based on a notification received from the cloud application store. When the flag is set, the client device may choose to ignore a cached or local version of a localization resource and access a version of the localization resource available at the cloud application store.

Figure 5:
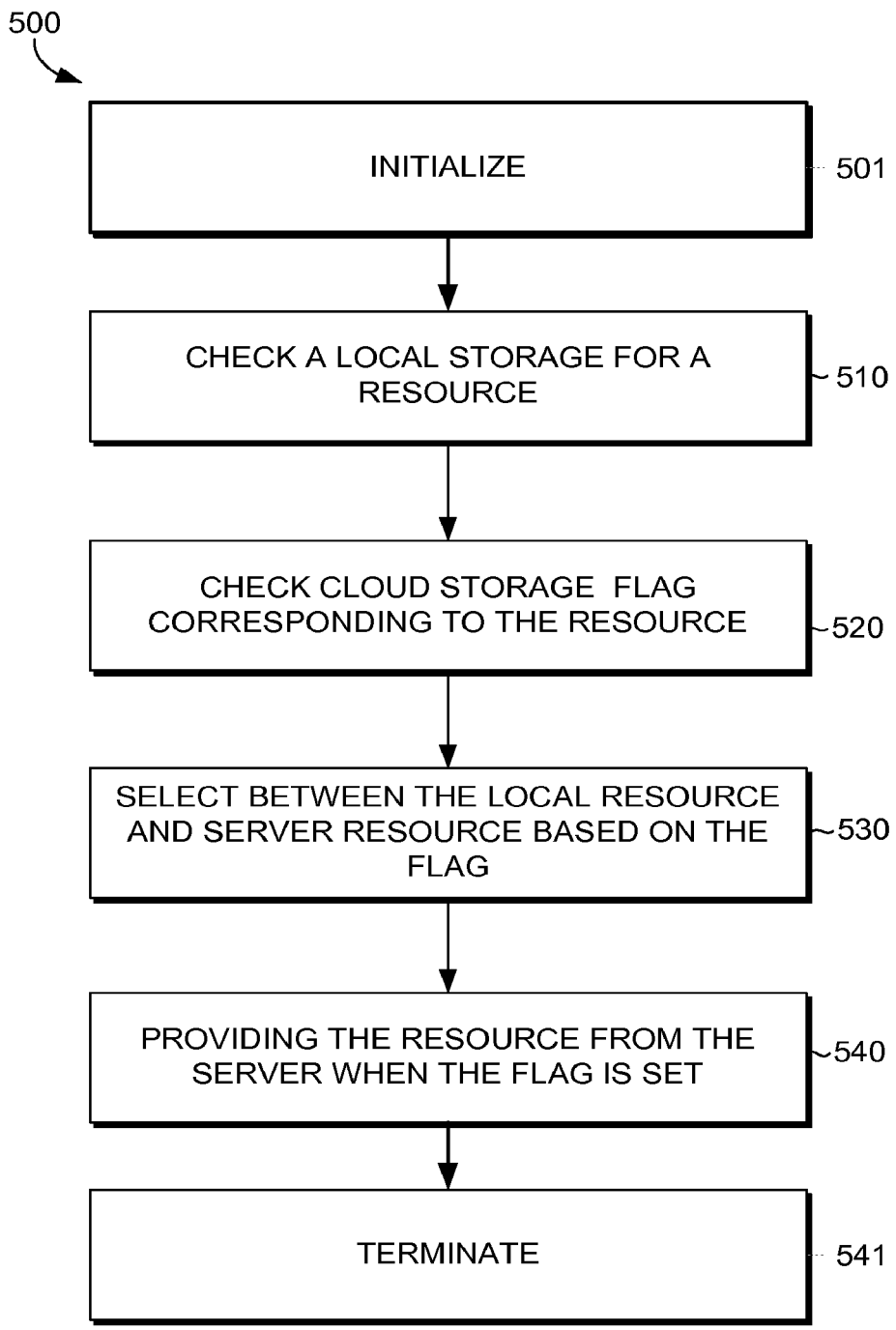
FIG. 5 is a logic diagram showing a method for selecting an appropriate localization resource for an application in accordance with embodiments of the invention.

FIG. 5 is a logic diagram 500 showing a method for selecting an appropriate localization resource for an application in accordance with embodiments of the invention. The method initializes in step 501. In step 510, a custom interceptor executed by the computing device may check a local storage on the computing device for a local resource requested by the application executed by the computing device. The applications and local resources are stored on the computing device. In some embodiments, the applications include sports, news or travel application.

In turn, the custom interceptor may check a flag associated with server storage, in 520. The flags indicate that the local resources should be updated based on a translation available at the cloud server. The updates to the application content may correspond to an advertisement displayed with the application. The cloud server stores each resource and corresponding translations of the resource and any available updates. In an embodiment, updates to the resource and corresponding translations are stored at the cloud server.

The custom interceptor may select between the local resource and a server translation based on the flag associated with the cloud server and the availability of the local resource, in step 530. The custom interceptor may check the flag periodically. When the flag is set, the custom interceptor is configured to obtain, from the cloud server, the localization resource for the application executed by the computing device. When the flag is not set and the local storage does not have the local resource, the custom interceptor provides a default resource to the application executed by the computing device. The method terminates in step 541. The default resource, in one embodiment, may be stored by the computing device is accessible via a local localization interface.

In some embodiments, the custom interceptor may determine whether a correction is needed in the local resource executed by the application. When the correction is required, the custom interceptor requests the correction from the cloud server. When the correction is available, the custom interceptor may obtain the correction from the cloud server when the application is launched or after a cache for the application expires.

In summary, a cloud server is configured to execute one or more cloud application stores. The cloud application stores provide application and localization resources for the applications. In some embodiments the localization resources are generated automatically and stored in an appropriate path. For instance, a language tool may generate a localization resource from the application content and store the localization in a folder that is based on the language and application content. The language tool may extract content from the applications, prepare a per-language localization resource, and store the localization resources in the appropriate storage location on the cloud server. When localization resources are available or updated, the client device may obtain a localization resource associated with a geographic region corresponding to location of the client device executing the application.

It will be understood by those of ordinary skill in the art that the order of steps explained above are not meant to limit the scope of the embodiments of invention in any way and, in fact, the steps may occur in a variety of different sequences within embodiments hereof. Any and all such variations, and any combination thereof, are contemplated to be within the scope of embodiments of the invention. Alternative embodiments will become apparent to those of ordinary skill in the art to which the embodiments of the invention pertains without departing from its scope.

From the foregoing, this innovation is one well adapted to attain all the ends and objects set forth above, together with other advantages which are obvious and inherent to the system and method. It should be understood that certain features and subcombinations are of utility and may be employed without reference to other features and subcombinations. This is contemplated by and is within the scope of the claims.

The technology claimed is:

1. A system for updating localization resources for an application by a cloud server, the system comprising:
   one or more processors; and
   one or more computer storage media storing computer-useable instructions that, when executed by the one or more processors, implement a method comprising:
      storing an application and a plurality of localization resources corresponding to the application, the plurality of localization resources comprising rendering instructions for rendering the application and associated content in different languages;
      updating at least one localization resource of the plurality of localization resources to reflect a change in the rendering instructions;
      receiving a get content request for the updated localization resource from a client device; and
      upon receiving the get content request, transmitting the updated localization resource from the cloud server to the client device.

2. The system of claim 1, wherein the associated content comprises one or more of audio content and video content.

3. The system of claim 1, wherein the updated localization resource corresponds to a language associated with a location detected by the client device.

4. The system of claim 1, wherein the updated localization resource corresponds to a user selected language selected on the client device.

5. The system of claim 1, wherein the get content request is transmitted when the application is downloaded or launched.

6. The system of claim 1, wherein the get content request is transmitted when a localization file corresponding to a previous version of the updated localization resource is corrupted.

7. The system of claim 1, wherein the get content request is transmitted when a correction to a localization file corresponding to a previous version of the updated localization resource is requested by the client device.

8. The system of claim 1, wherein the updated localization resource is downloadable by the client device without requiring a restart of the application.

9. One or more computer-readable devices having computer-executable instructions embodied thereon for performing a method for providing new and updated localization resources for an application via a cloud-based network server, the method comprising:
   generating a plurality of localization resources for an application, the plurality of localization resources comprising rendering instructions for rendering the application and associated content in different languages;
   storing the plurality of localization resources and the application;
   generating an additional localization resource and an updated localization resource;
   updating the stored plurality of localization resources to include the additional localization resource and the updated localization resource;
   monitoring a plurality of client devices having the application stored thereon;
   receiving an indication that the application is launched on a client device of the plurality of client devices, the indication including an identifier of one or more localization resources localized at the client device;
   determining that at least one of the additional localization resource and the updated localization resource are not localized at the client device; and
   transmitting at least one of the additional localization resource and the updated localization resource to the client device.

10. The one or more computer-readable devices of claim 9, wherein the additional localization resource corresponds to a language not currently localized at the client device.

11. The one or more computer-readable devices of claim 9, wherein the updated localization resource reflects one or more changes to the rendering instructions for rendering the application.

12. The one or more computer-readable devices of claim 9, wherein the one or more localization resources localized at the client device are stored in a cache on the client device.

13. The one or more computer-readable devices of claim 9, wherein the one or more localization resources localized at the client device are stored in a delta file.

14. The one or more computer-readable devices of claim 9, wherein the at least one of the additional localization resource and the updated localization resource are transmitted without an update to the application.

15. One or more computer-readable devices having computer-executable instructions embodied thereon for performing a method for selecting an appropriate resource for an application, the method comprising:
   requesting a localization resource by an application executing on a client device, the localization resource comprising rendering instructions for rendering the application and associated content in a language other than a default language for the application;
   checking a local storage on the client device for a locally-stored localization resource;
   checking for a flag indicating that an updated localization resource for the application is available at a network server;
   when the flag has been received, requesting and obtaining the updated localization resource from the network server, wherein the updated localization resource is obtained without requiring a restart of the application;
   selecting between the locally-stored localization resource and the updated localization resource, wherein when the updated localization resource has been obtained from the server, the updated localization resource is selected; and
   executing, by the client device, the rendering instructions corresponding to the selected localization resource.

16. The one or more computer-readable devices of claim 15, further comprising transmitting a request for a the localization resource to the network server and receiving the localization resource from the network server, when the locally-stored localization resource is not stored on the client device.

17. The one or more computer-readable devices of claim 15, wherein the selected localization resource is selected in real-time.

18. The one or more computer-readable devices of claim 15, wherein the associated content comprises one or more of audio content and video content.

19. The one or more computer-readable devices of claim 15, wherein the client device maintains an in-memory cache of the locally-stored localization resource.

20. The one or more computer-readable devices of claim 19, wherein the in-memory cache is updated when the updated localization resource is obtained.

\* \* \* \* \*